(12) United States Patent
Keshavarzian et al.

(10) Patent No.: US 7,738,455 B2
(45) Date of Patent: Jun. 15, 2010

(54) METHOD AND SYSTEM OF OVERLAPPING MULTIPLE SCHEDULES FOR BROADCAST AND ACKNOWLEDGEMENT COLLECTION

(75) Inventors: Abtin Keshavarzian, Palo Alto, CA (US); Bhaskar Srinivasan, Menlo Park, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 874 days.

(21) Appl. No.: 11/488,380

(22) Filed: Jul. 17, 2006

(65) Prior Publication Data
US 2008/0013501 A1    Jan. 17, 2008

(51) Int. Cl.
*H04L 12/28* (2006.01)
(52) U.S. Cl. .................. 370/390; 370/216; 370/241
(58) Field of Classification Search .................. 370/312, 370/390, 400, 432, 270
See application file for complete search history.

(56) References Cited

U.S. PATENT DOCUMENTS

| 5,613,198 | A  | * | 3/1997 | Ahmadi et al. | ............... 370/337 |
| 2005/0192037 | A1 | * | 9/2005 | Nanda et al. | ................ 455/509 |

FOREIGN PATENT DOCUMENTS

| GB | 2 287 383 | 9/1995 |
| WO | WO 02/23791 | 3/2002 |
| WO | WO 02/23814 | 3/2002 |

* cited by examiner

*Primary Examiner*—Ayaz R Sheikh
*Assistant Examiner*—Blanche Wong
(74) *Attorney, Agent, or Firm*—Kenyon & Kenyon LLP

(57) ABSTRACT

A method of acknowledged communication in a network includes transmitting a message to at least one node of the network, wherein the message is transmitted in each of a plurality of broadcast rounds that overlap one another according to a predetermined broadcast schedule, receiving the message by the at least one node, and transmitting an acknowledgement of the message from the at least one node, wherein the acknowledgement is transmitted in each of a plurality of collection rounds that overlap one another according to a predetermined collection schedule.

26 Claims, 13 Drawing Sheets

*Input*: Connectivity graph, Number of frequencies (*NF*)
*Output*: The broadcast schedule:
   A sequence of 3-tuples (*t*,*tx*,*fq*) : At time *t*, node *tx* sends in frequency *fq*

<u>*Algorithm:*</u>
Start with the first time slot
While ( There are nodes that have not yet received the message )
{
   For each frequency channel
   {
      Find the set of nodes that are receiving at current time slot and the chosen frequency Find the set of nodes that have already received the message and also if scheduled to transmit at current time slot and frequency channel, ensure they do not interfere with any previously scheduled transmission Among all such nodes find the one which can communicate to maximum number of new nodes (i.e., nodes that have not yet received the message)

Schedule the selected node to transmit at current time slot and frequency
   }
   If no new schedule was added to any of the frequency channels
      Go to the next time slot
   Else
      Continue with the same time slot
}

Figure 8

*Output*: Schedule for acknowledgment collection:
A sequence of 4-tuples ($t, tx, rx, fq$): at time $t$ node $tx$ send to node $rx$ in frequency $fq$ <u>Algorithm:</u>
*CurrentLev* = Last Level                            // Start with the last level
*CurrentTm* = 1                                      // and with the first time slot
While( there are still nodes remained to be scheduled )
{
    *CurrentFreq* = 1                                // Start with the first frequency channel:
    While( *CurrentFreq* <= *MaxFreq* )              // while there are freqs to be considered
    {
        Compute *RNodes*: set of nodes at level *CurrentLev* which are not yet scheduled If (*RNode* is empty)                        // If all nodes in current level are scheduled)
        {
            *CurrentLev* = *CurrentLev* - 1          // Go one level down
            *CurrentTm* = 1                          // Restart from the first time slot
            *CurrentFreq* = 1                        // and with the first frequency
        }
        For each node *nd* in *RNode*
        {
            If ( node *nd* is not scheduled to transmit or receive at *CurrentTm*
            &  none of the neighbors of *nd* are receiving at *CurrentTM* and *CurrentFreq*
            &  the last time node *nd* received any packet < *CurrentTM* )
            {
                // Find  the set of all possible parents of *nd*:
                *PNodes* = All neighbors *pt* of node *nd* such that
                      Level of *pt* <= *CurrentLev*  &
                      Node *pt* has not yet scheduled
                      Node *pt* does not receive at *CurrentTm* and frequency *CurrentFreq* & Node *pt* is not in hearing range of another set
                      *CurrentTm* and *CurrentFreq*
                If (*PNodes* is not empty) {
                    Randomly choose one of the nodes in *PNodes*
                    Add the following schedule :
                        Node *nd* sends to node *pt* at time *CurrentTM* and frequency *CurrentFreq*
                        Add 4-tuple (*CurrentTm, nd, pt, CurrentFreq*)
                    Break   // From the loop of "for each node in *RNode*"
                }
            }
        }
        If (no success in adding a schedule in the last round)
            *CurrentFreq* = *CurrentFreq* + 1        // Go to the next frequency
        // Otherwise we again try the same frequency
    }
    *CurrentTm* = *CurrentTm* + 1    // Go to the next time slot
}

Figure 9

METHOD AND SYSTEM OF OVERLAPPING MULTIPLE SCHEDULES FOR BROADCAST AND ACKNOWLEDGEMENT COLLECTION

FIELD OF THE INVENTION

The present invention relates to a method and system for scheduling the broadcast of messages and the collection of acknowledgements with minimum latency by overlapping multiple schedules.

BACKGROUND INFORMATION

In a wireless network, the transmission medium may be inherently lossy and susceptible to interference. To better ensure reliable communications in a wireless network, the receiver may be required to acknowledge every message that is received so that the sender may be notified when messages are properly received, and have the opportunity to retransmit an unacknowledged message. Such a method of acknowledged communication has been implemented, for example, in a unicast communication scheme, where the sender sends a message to only one receiver and expects only one acknowledgement of the receipt the message. In a broadcast or multicast communication scheme, however, where the sender sends a message to more than one receiver and expects multiple acknowledgements, such a method may be problematic and/or inefficient.

For example, there is the scenario in which each node of a wireless network is equipped with a temperature sensor, and a query is to be made as to which sensors are currently reading a temperature in a particular range. In this case, the query message is first broadcasted to all nodes in the network, then each node is required to reply back with its own reading or status, but such replies may require significant resources to handle.

As another example, there is the scenario where each node of the wireless network is equipped with an alarm sensor, and a command is to be issued to collectively arm/disarm the sensors. In this case, the command message may be issued via a base station, which is sent to all nodes in the network, then each node is required to reply back indicating whether the command was successfully executed or not, but as in the previous example, such replies from all of the nodes may require significant resources to handle.

Latency may also be an issue with respect to acknowledged communications. Here, it may at least be a challenge to ensure that all nodes in the network receive the message/command and respond appropriately in a reliable and timely fashion, and that all responses from the nodes are also received and processed in a reliable and timely fashion. In this regard, the collection and processing of responses by a central node, for example, such as a base station, may be a particular challenge.

SUMMARY OF THE INVENTION

The present invention relates to a method and system for scheduling the broadcast of messages, and the collection of acknowledgements, which is reliable and fast.

According to an exemplary embodiment and/or exemplary method of the present invention, each message to be acknowledged is sent multiple times to increase reliability and robustness with respect to the packet transmission success rate, and the multiple transmissions of the message are scheduled in multiple rounds, which overlap one another in a manner that is essentially collision-free, and which should reduce the overall latency required to acknowledge the messages.

An exemplary embodiment of the present invention is directed to a method of acknowledged communication in a network, the method including transmitting a message to at least one node of the network, wherein the message is transmitted in each of a plurality of broadcast rounds that overlap one another according to a predetermined broadcast schedule, receiving the message by the at least one node, and transmitting an acknowledgement of the message from the at least one node, wherein the acknowledgement is transmitted in each of a plurality of collection rounds that overlap one another according to a predetermined collection schedule.

Another exemplary embodiment of the present invention is directed to a method of acknowledged communication in a network, in which the broadcast schedule and the collection schedule are determined prior to the transmission of the message and prior to the collection of the acknowledgement.

Yet another exemplary embodiment of the present invention is directed to a method of acknowledged communication in a network, in which the broadcast schedule and the collection schedule are determined by a central node of the network.

Still another exemplary embodiment of the present invention is directed to a method of acknowledged communication in a network, in which the broadcast schedule and the collection schedule are determined so as to provide essentially collision-free communication.

Yet another exemplary embodiment of the present invention is directed to a method of acknowledged communication in a network, in which a plurality of frequency channels is used to broadcast the message.

Still another exemplary embodiment of the present invention is directed to a method of acknowledged communication in a network, in which a plurality of frequency channels is used to transmit the acknowledgment.

Yet another exemplary embodiment of the present invention is directed to a method of acknowledged communication in a network, in which for each of the plurality of broadcast rounds, the message is transmitted via a different communication path.

Still another exemplary embodiment of the present invention is directed to a method of acknowledged communication in a network, in which for each of the plurality of collection rounds, the acknowledgement is transmitted via a different communication path.

Yet another exemplary embodiment of the present invention is directed to a method of acknowledged communication in a network, in which the at least one node of the network is arranged in a hierarchical manner with respect to other nodes of the network.

Still another exemplary embodiment of the present invention is directed to a method of acknowledged communication in a network, in which a parent node of the network combines an acknowledgement from one or more children nodes with an acknowledgement from the parent node so that a single combined acknowledgement is sent by the parent node.

Yet another exemplary embodiment of the present invention is directed to a method of acknowledged communication in a wireless network, the method including determining a broadcast schedule to broadcast a message to at least one node of the wireless network, the broadcast schedule providing a plurality of overlapping rounds to broadcast the message, each round transmitting the message to the at least one node via a different communication path, determining a collection schedule to collect an acknowledgement from the at least one node, the collection schedule providing a plurality of overlapping rounds to transmit and receive the acknowledgement, each round transmitting the acknowledgement from the at least one node to a central node of the wireless network via a different communication path, providing the broadcast schedule and the collection schedule to the at least one node, transmitting the message according to the broadcast schedule, and collecting the acknowledgment according to the collection schedule.

Still another exemplary embodiment of the present invention is directed to a method of acknowledged communication in a wireless network, in which the broadcast schedule and the collection schedule are determined prior to the transmission of the message and prior to the collection of the acknowledgement.

Yet another exemplary embodiment of the present invention is directed to a method of acknowledged communication in a wireless network, in which the broadcast schedule and the collection schedule are determined by the central node of the wireless network.

Still another exemplary embodiment of the present invention is directed to a method of acknowledged communication in a wireless network, in which the broadcast schedule and the collection schedule are determined so as to provide essentially collision-free communication.

Yet another exemplary embodiment of the present invention is directed to a method of acknowledged communication in a wireless network, in which a plurality of frequency channels is used to at least one of broadcast the message and transmit the acknowledgment.

Still another exemplary embodiment of the present invention is directed to a method of acknowledged communication in a wireless network, in which the at least one node of the wireless network is arranged in a hierarchical manner with respect to other nodes of the network.

Yet another exemplary embodiment of the present invention is directed to a method of acknowledged communication in a wireless network, in which a parent node of the network combines an acknowledgement from one or more children nodes with an acknowledgement from the parent node so that a single combined acknowledgement is sent by the parent node.

Still another exemplary embodiment of the present invention is directed to a method of acknowledged communication in a wireless network, the method including transmitting a message to at least one node of the network, wherein the message is transmitted to the at least one node in each of a plurality of broadcast rounds that overlap one another according to a broadcast schedule computed by a central node of the wireless network and distributed to the at least one node prior to the broadcast of the message, the broadcast schedule computed so as to provide essentially collision-free communication, receiving the message by the at least one node, and transmitting an acknowledgement of the message by the at least one node, wherein the acknowledgement is transmitted in each of a plurality of collection rounds that overlap one another according to a collection schedule computed by the central node and distributed to the at least one node prior to the collection of the acknowledgement, the collection schedule computed so as to provide essentially collision-free communication, in which a plurality of frequency channels is used to at least one of broadcast the message and transmit the acknowledgment.

Yet another exemplary embodiment of the present invention is directed to a method of acknowledged communication in a wireless network, in which for each of the plurality of broadcast rounds, the message is transmitted to the at least one node via a different communication path, and/or for each of the plurality of collection rounds, the acknowledgement is transmitted via a different communication path.

Still another exemplary embodiment of the present invention is directed to a method of acknowledged communication in a wireless network, in which the at least one node of the network is arranged in a hierarchical manner with respect to other nodes of the network so that a parent node of the network combines an acknowledgement from one or more children nodes with an acknowledgement from the parent node so that a single combined acknowledgement is sent by the parent node.

BRIEF DESCRIPTION OF THE DRAWINGS

FIG. 8 shows exemplary pseudo code for determining multiple broadcast schedules that overlap one another and provide essentially collision-free communication.

FIG. 9 shows exemplary pseudo code for determining multiple acknowledgement collection schedules that overlap one another and provide essentially collision-free communication.

DETAILED DESCRIPTION

Figure 1:
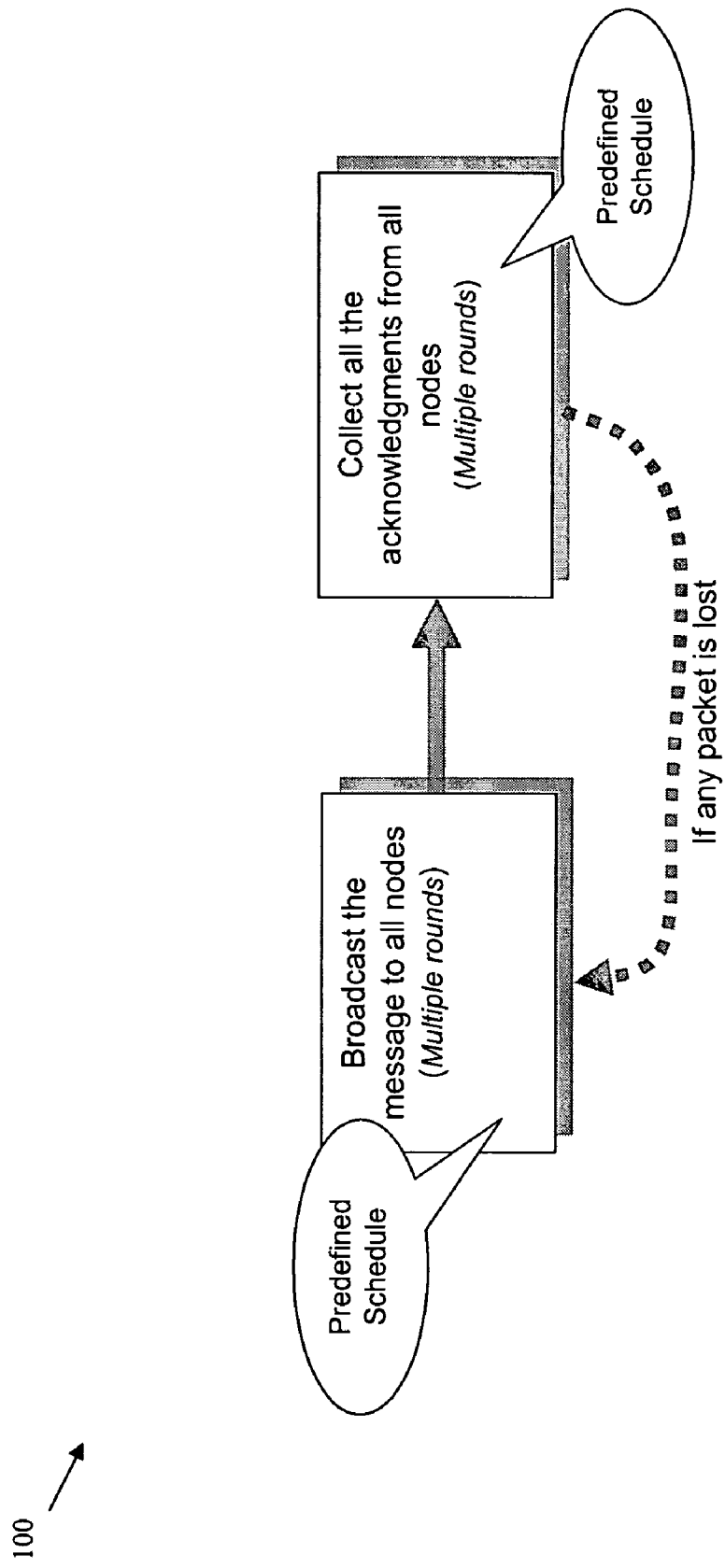
FIG. 1 shows an exemplary method for acknowledging broadcast of messages to nodes of a network, in which a predefined deterministic schedule is computed for the message broadcast and the acknowledgement collection.

FIG. 1 shows an exemplary method for acknowledged broadcast of messages to nodes of a network, in which a predefined deterministic schedule is computed for the message broadcast and the acknowledgement collection. The schedules may be computed, for example, by the base station, and distributed to the nodes during the initialization of the network. Thereafter, during normal network operation, whenever the base station receives a message to broadcast, the message is first sent according to the broadcast schedule to all nodes in the network, then the acknowledgements are collected according to the collection schedule from all nodes in the network and sent to the base station, which in turn may inform the initiator of the message (e.g., a user).

According to an exemplary embodiment of the present invention, the deterministic schedules may include a specification of the particular actions to be performed by each node of the network for each instant in time with respect to their transmissions, frequency channel selection, link monitoring, etc. In this regard, the deterministic schedules may be optimized for certain criteria, including, for example, speed and/or reliability.

By using predefined deterministic schedules, collisions may be avoided since such schedules may be designed to be essentially collision-free. Moreover, with a centralized approach, the schedules may be computed beforehand and optimized so that the entire process is accomplished in a relatively short period of time. In this regard, the broadcast of the message(s) and the collection of acknowledgements may be performed in a separate manner so that a deterministic schedule is used in each instance.

Here, it may be assumed, for example, that a connectivity graph of the network is known, time is slotted, and during each time slot only one packet is exchanged. Moreover, the length of the time slot may be determined by the size of the packet and the pre-computed schedule(s) should be essentially collision-free. Additionally, each node of the network may be configured to transmit or receive in a particular frequency channel during each time slot, and the particular frequency channel used by the nodes may be known.

Figure 2:
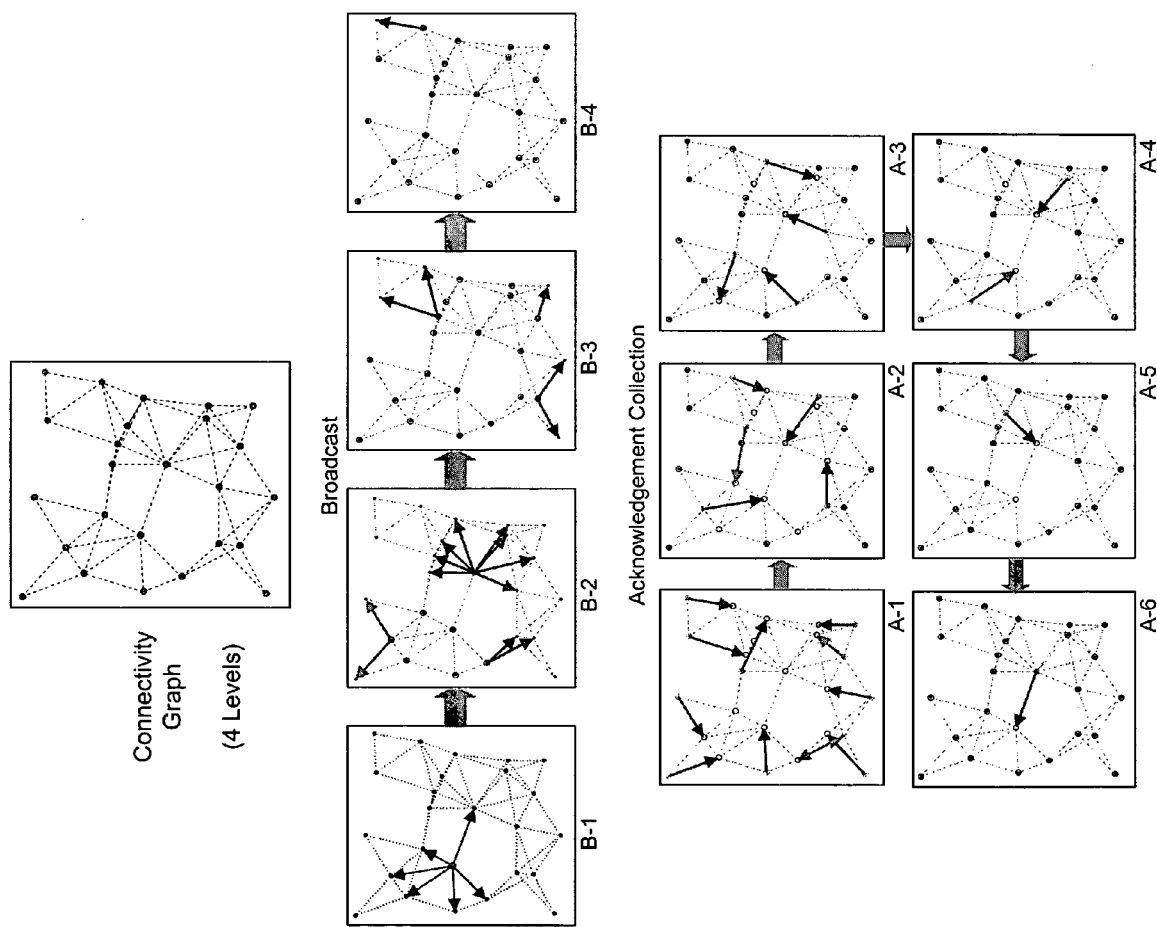
FIG. 2 shows exemplary connectivity graphs, which demonstrate the broadcast of a message to all nodes the network, and the collection of acknowledgements from each of the nodes.

FIG. 2 shows exemplary connectivity graphs B-1 to B-4 and A-1 to A-6, which demonstrate, respectively, the broadcast of a message to all nodes the network, and the collection of acknowledgements from each of the nodes. Here, the arrows show which nodes should send and which node should receive at each time slot. The nodes that transmit in the same time slot transmit in a different frequency channel. As shown in FIG. 2, four time slots are used to broadcast the message to all of the nodes, and six time slots are used to collect the acknowledgements.

To ensure that the message is broadcast to all nodes, and that an acknowledgement indicating receipt of the message is received from all nodes, one or more exemplary methods may be performed.

According to one exemplary method, if any packet is lost, the entire broadcast and acknowledgement process is repeated. Such an exemplary method may only be practical if the probability of packet loss is quite small (e.g., 1 in $10^{-4}$). If, however, the probability of packet loss is higher, this exemplary method may not be optimum since any packet loss may result in a doubling of the delay.

According to another exemplary method, if any packet is lost, the particular packet is resent to only those node(s) from which an acknowledgement was not received. Although this exemplary method may involve less delay as compared to the previously discussed exemplary method, with this exemplary method it may be difficult to determine exactly which node(s) failed to acknowledge the packet, and additionally, it may be difficult to determine a suitable secondary schedule for resending the packet to the non-acknowledging nodes.

According to another exemplary method, each packet is sent multiple times to reduce the probability that a node does not receive the packet. In this regard, the multiple copies of the packet may be provided in each time slot, but to do so may require a much longer time slot, which may increase the delay.

According to another exemplary method, each packet is sent multiple times to reduce the probability that a node does not receive the packet, and each time a different path is used to send the same packet. In this regard, multiple overlapping schedules may be computed to send the packet to each node two or more times using different paths. Here, each schedule is computed so that each node receives the packet in a collision free manner two or more times per broadcast round, and so that in each broadcast round the packet is received from a different source.

Figure 13:
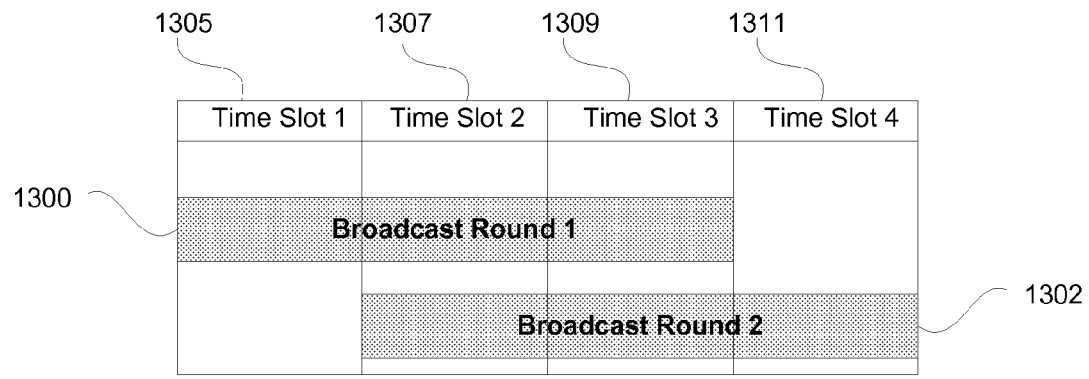
FIG. 13 illustrates overlapping broadcast rounds according to an example embodiment of the present invention.
Figure 14:
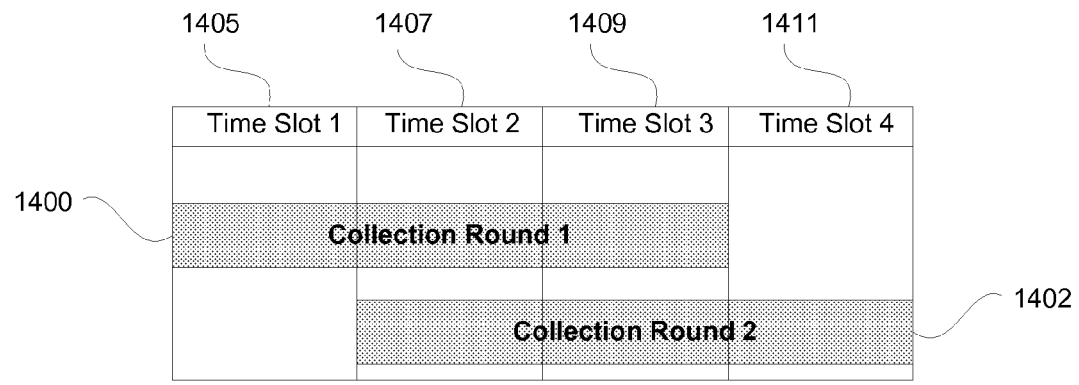
FIG. 14 illustrates overlapping collection rounds according to an example embodiment of the present invention.

FIG. 13 illustrates an example of an overlap of broadcast rounds (Broadcast Round 1 1300 and Broadcast Round 2 1302). By way of example, four times slots, including time slot 1 1305, time slot 2 1307, time slot 3 1309 and time slot 4 1311, scheduled for broadcasting a message, are shown. The schedule assigns consecutive time slots 1-3 1305 to 1309 to Broadcast Round 1 1300, and assigns consecutive time slots 2-4 1307 to 1311 to Broadcast Round 2 1302, so that Broadcast Round 1 1300 and Broadcast Round 2 1302 overlap during scheduled time slots 2-3 1307 and 1309, those time slots being assigned by the schedule to both Broadcast Round 1 1300 and Broadcast Round 2 1302.

Figure 3:
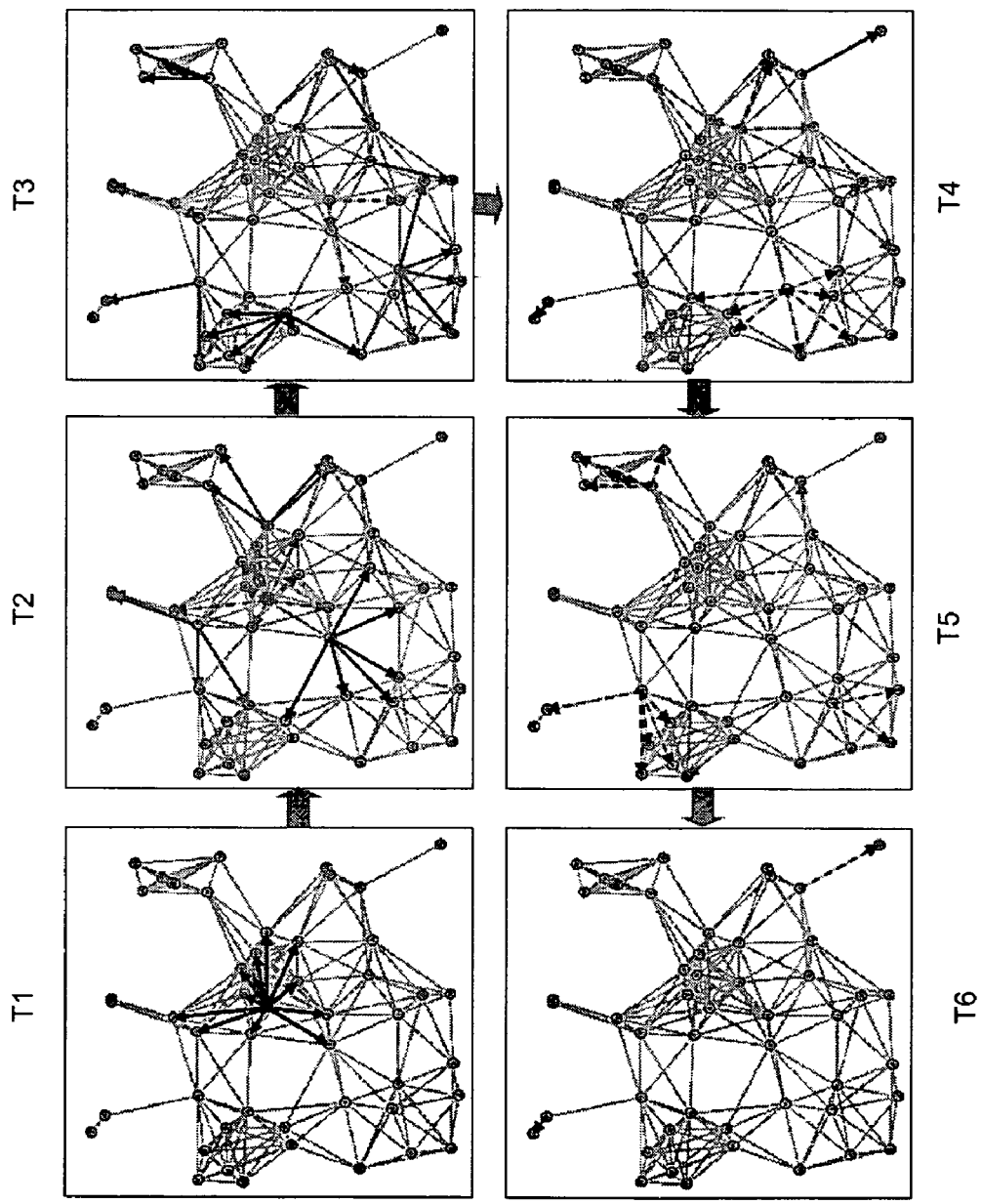
FIG. 3 shows an implementation of exemplary overlapping broadcast schedules, in which a total of six time slots are used to send the packet to all nodes in two broadcast rounds, according to an example embodiment of the present invention.

FIG. 3 shows an exemplary sequence of connectivity graphs demonstrating use of overlapping broadcast schedules, in which a total of six time slots T1 to T6 are used to the send the packet to all nodes in two broadcast rounds. Here, the solid arrows indicate the schedule for the first broadcast round, and the dashed arrows indicate the schedule for the second broadcast round. The first broadcast round finishes at the end of the fourth time slot T4, and the second broadcast round finishes at the end of the sixth time slot T6. In this regard, it is noted that if instead of overlapping the two schedules the first schedule were to be simply repeated, the overall process would require eight time slots. Hence, by overlapping the two schedules, the packet is sent to all nodes twice in six time slots rather than eight time slots.

In overlapping the two schedules, the second schedule may finish sooner because the second schedule may take advantage of unused links and unused time slots in the first schedule. In this manner, the idle resources of the system may be better utilized. Moreover, each node should receive the packet from two different sources, so the exemplary method may be more reliable and robust.

Figure 4:
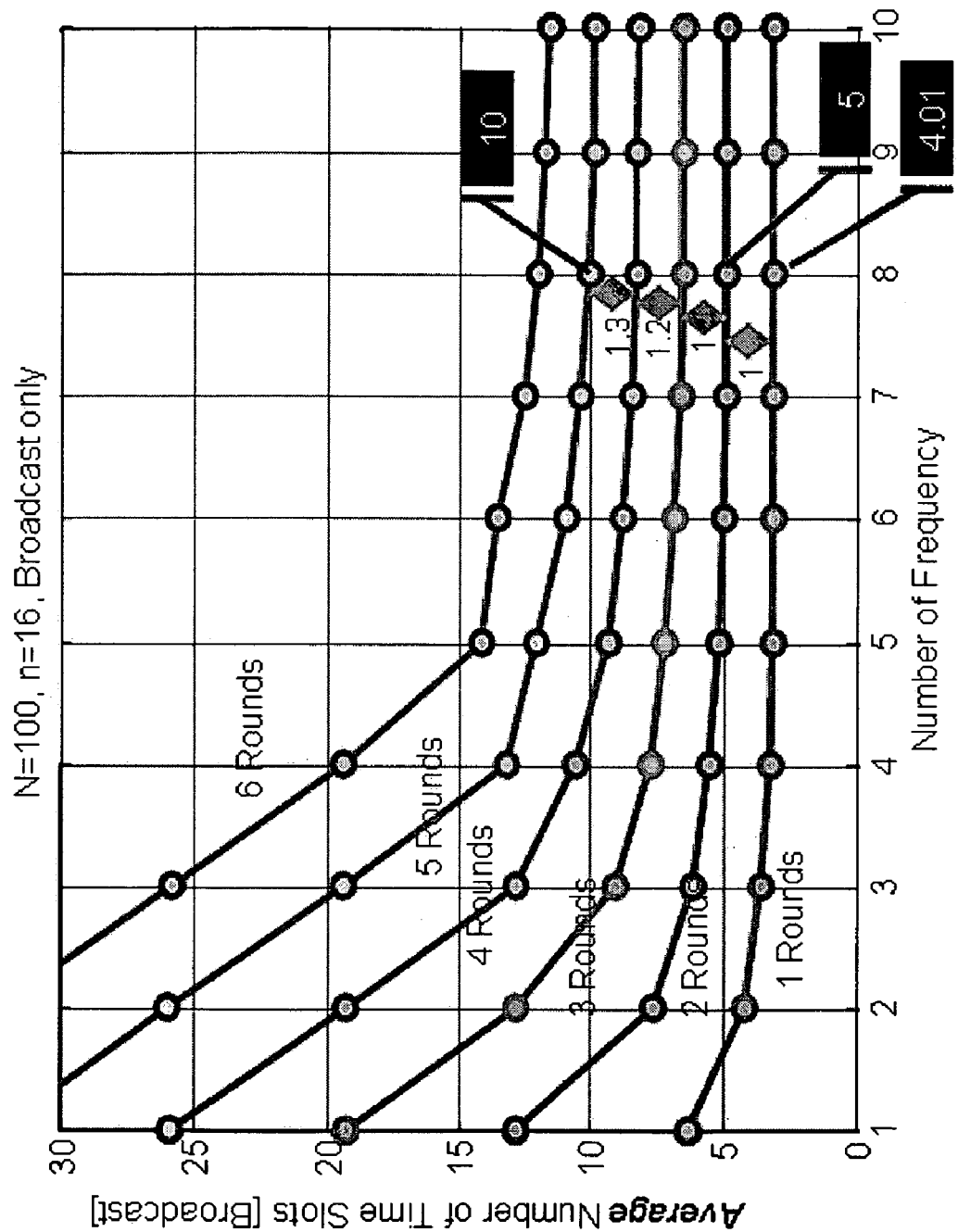
FIG. 4 shows a graph of the average number of time slots required to transmit a packet to all nodes in a network of 100 nodes using one round to broadcast the packet, and using two, three, four, five or six overlapping rounds to broadcast the packet, versus the number of frequencies used for the broadcast.

FIG. 4 shows a graph of the average number of time slots required to transmit a packet in a network of 100 nodes using one round to broadcast the packet, and using two, three, four, five or six overlapping rounds to broadcast the packet, versus the number of frequencies used for the broadcast. Here, each node is assumed to have an average of sixteen neighboring nodes. As shown in FIG. 4, by overlapping the broadcast schedules, only a few additional time slots are required for each successive broadcast round. For example, if eight frequencies are used, an average of four time slots is required for one non-overlapping broadcast round, but for two overlapping broadcast rounds, only an additional time slot is required on average, and for five overlapping broadcast rounds only ten time slots are required on average.

The exemplary method of overlapping broadcast schedules may provide certain benefits. For example, the exemplary method of overlapping broadcast schedules may be more time efficient with respect to delay. Moreover, because different paths are used to send the same packet, the exemplary method of overlapping broadcast schedules may be more robust against link and/or node failures. Furthermore, from the perspective of the node, the exemplary method of overlapping broadcasts schedules may be less difficult to implement. This is because according to one exemplary embodiment the base station node is responsible for computing the broadcast schedule and the network nodes are only required to follow the computed schedule.

Figure 5:
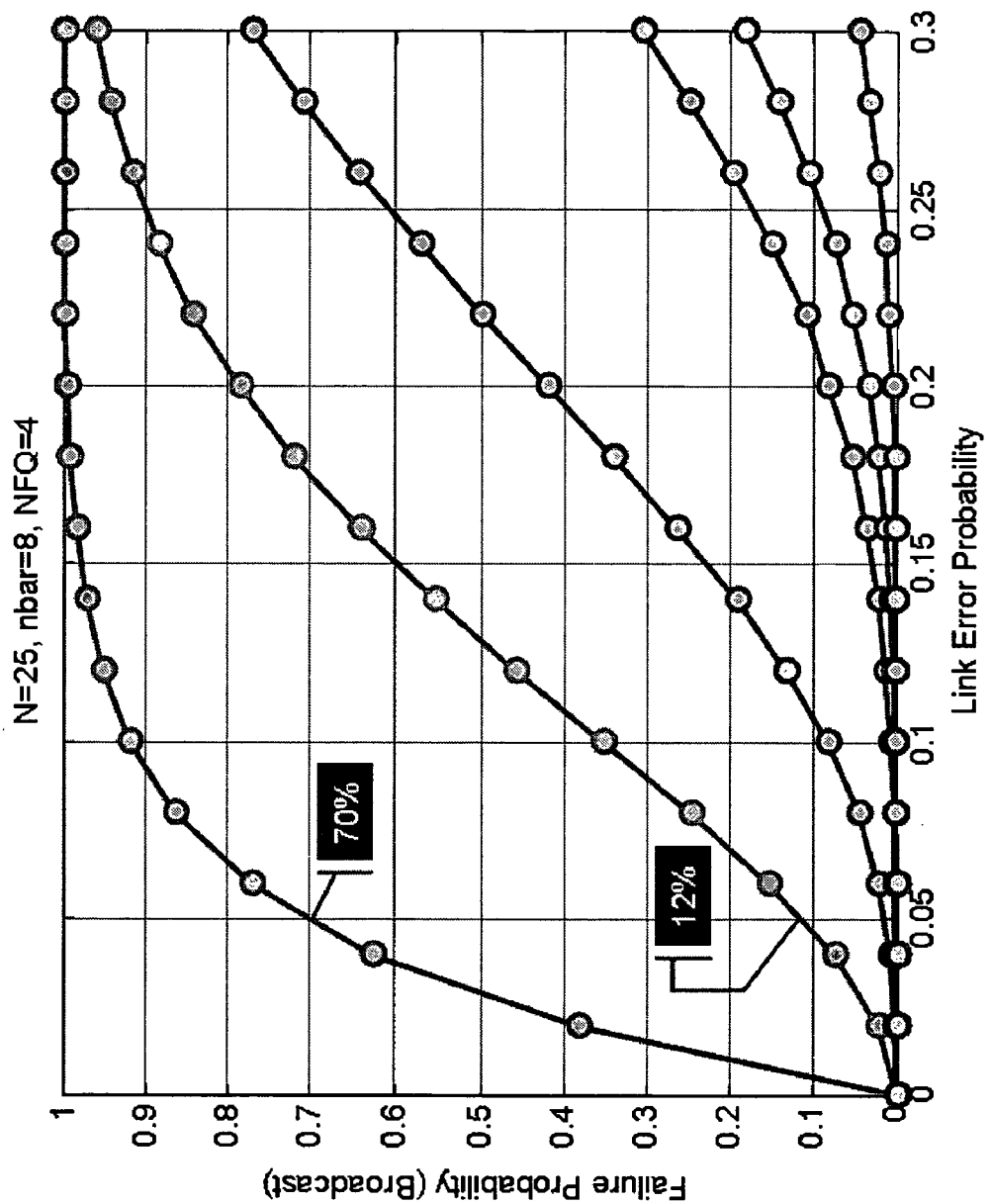
FIG. 5 shows an exemplary graph of the probability of a link failure in a network of 25 nodes versus the probability that at least one node of the network will fail to receive the broadcast.

FIG. 5 shows an exemplary graph of the probability of a link failure in a network of 25 nodes versus the probability that at least one node of the network will fail to receive the broadcast. Here, it is assumed that the probability of a link failing is independent of other link failures, including past link failures. As shown in FIG. 5, even if there is a small probability of link failure, with only one round of broadcast there is a good chance that at least one node of the network will fail to receive the broadcast. For example, if the probability of link failure is 0.05, with one round of broadcast there is a 70% chance that at least one node of the network will fail to receive the broadcast. However, with two overlapping rounds of broadcast the probability that at least one node of the network will fail to receive the broadcast reduces to 12%. If more overlapping rounds of broadcast are used, the probability of failure decreases significantly. Hence, despite the probability of link failure, the use of overlapping schedules in multiple rounds of broadcast provides improved overall performance. For example, if the probability of a link failing is 30%, after six overlapping rounds of broadcast the probability that at least one node of the network will fail to receive the broadcast is less than 5%. Here, six overlapping rounds of broadcast only requires thirteen time slots as compared to the four time slots required for one non-overlapping round of broadcast.

Figure 6:
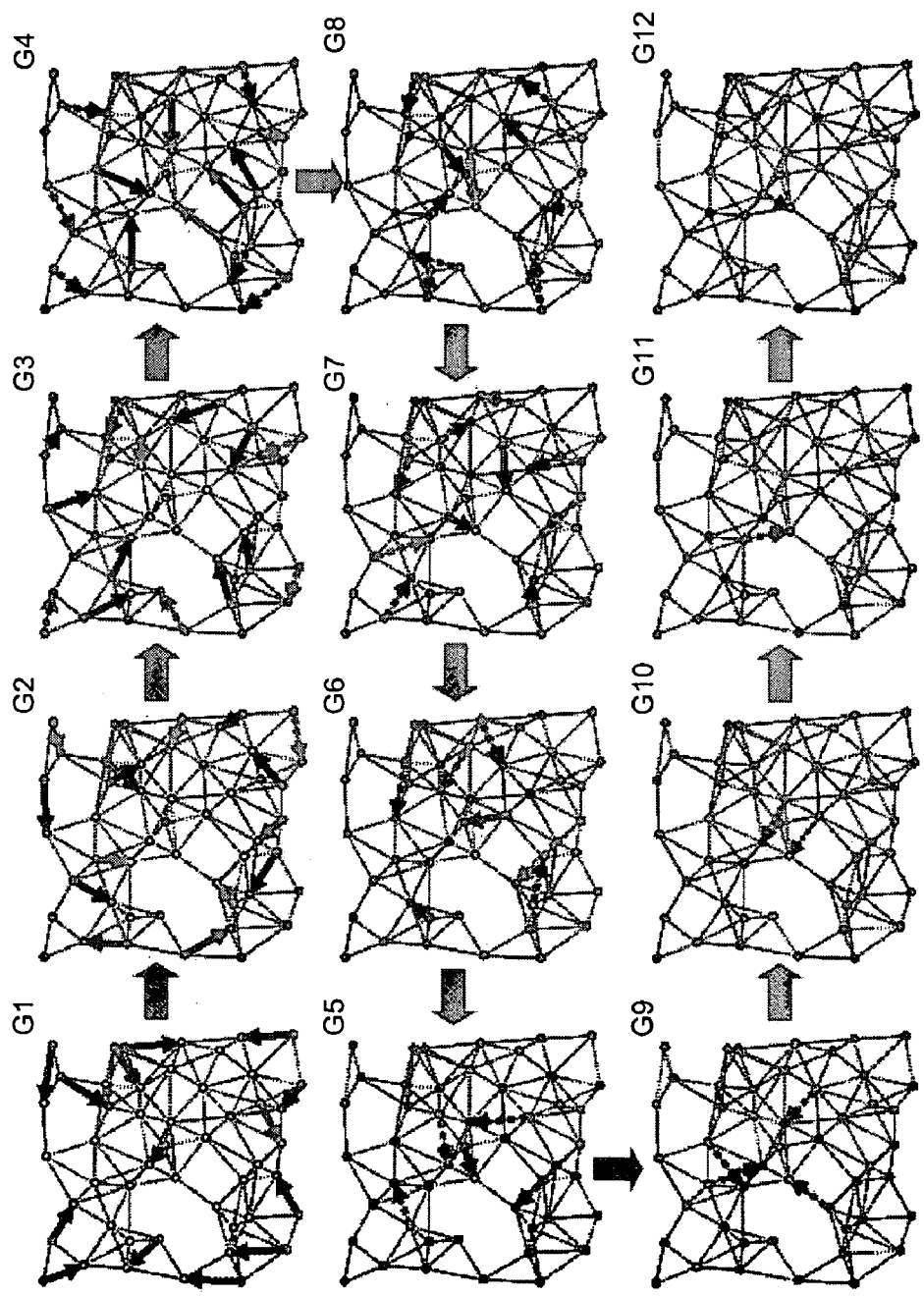
FIG. 6 shows an exemplary sequence of connectivity graphs demonstrating the use of overlapping collection schedules, in which two overlapping rounds are used to transmit the acknowledgement such that each node of the network sends the acknowledgement via a different communication path to two or more different nodes in the network.

FIG. 6 shows an exemplary sequence of connectivity graphs G1 to G12 demonstrating the use of overlapping collection schedules, in which two overlapping rounds are used transmit the acknowledgement such that each node of the network sends the acknowledgement via a different communication path to two or more different nodes in the network. Here, the first round of acknowledgements requires eight times slots, while the second round of acknowledgements requires only four additional time slots.

Figure 7:
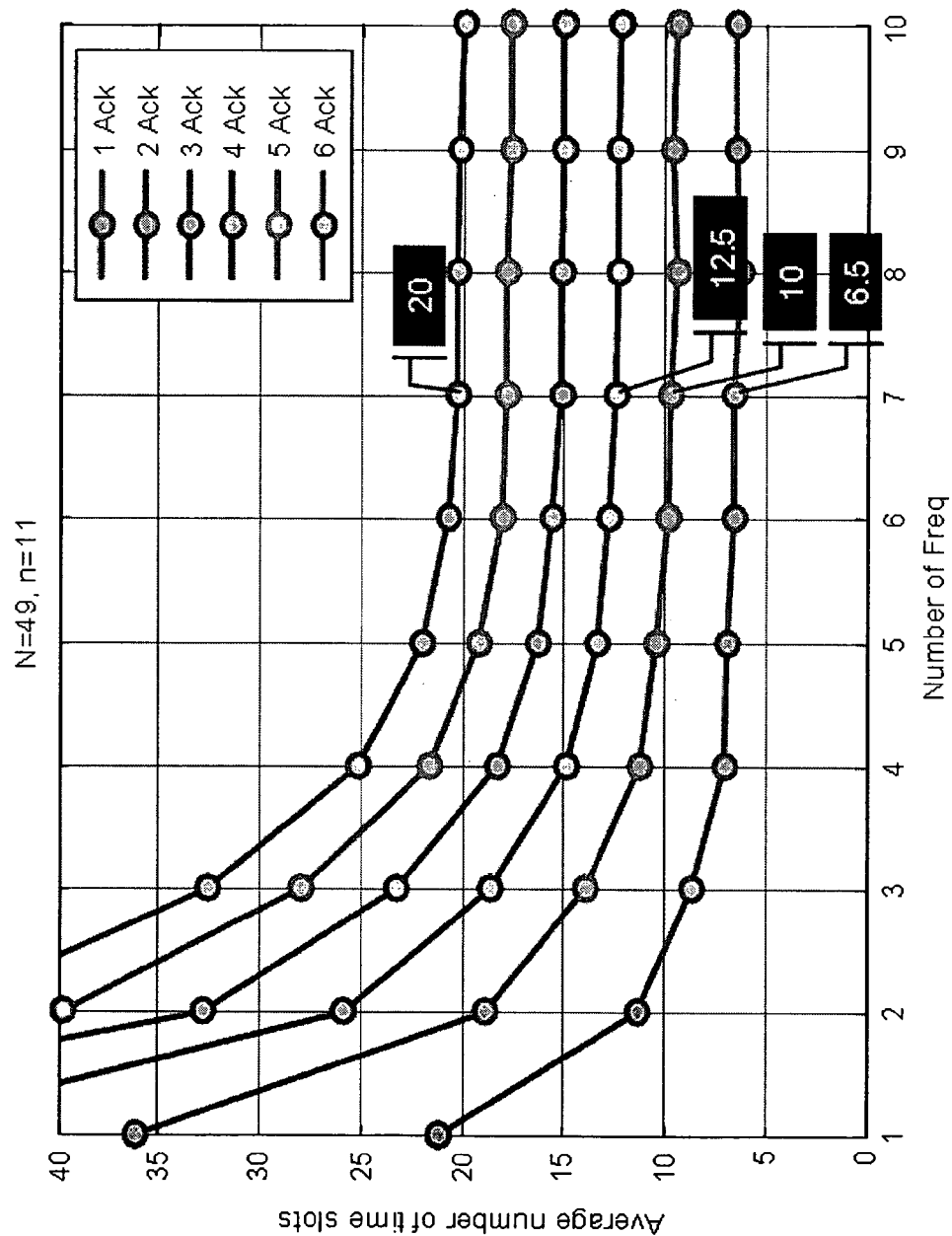
FIG. 7 shows a graph of the average number of time slots required to collect acknowledgements in a network of 49 nodes using one round to collect acknowledgements, and using two, three, four, five or six overlapping rounds to collect acknowledgements, versus the number of frequencies used to transmit the acknowledgements.

FIG. 7 shows a graph of the average number of time slots required to collect acknowledgements in a network of 49 nodes using one round to collect acknowledgements, and using two, three, four, five or six overlapping rounds to collect acknowledgements, versus the number of frequencies used to transmit the acknowledgements. For example, for one round of collection on average 6.5 time slots are required to collect acknowledgements. In comparison, for two rounds of collection that overlap one another on average 10 time slots are required, which is only 3.5 additional time slots as compared to the single round of collection.

FIG. 8 shows exemplary pseudo-code for determining multiple broadcast schedules that overlap one another and provide essentially collision-free communication. Here, the pseudo-code is provided so that every node in the network should receive the broadcasted message at least once from one of its neighboring nodes. Initially, the base station is the only node that has possession of the message to be broadcast. During each time slot, the network node(s) who can send the message to the most nodes are iteratively added to the schedule.

FIG. 9 shows exemplary pseudo-code for determining multiple acknowledgement collection schedules that overlap one another and provide essentially collision-free communication. Here, it is assumed that an acknowledgment packet is to be forwarded to a central node of the network, such as, for example, a base station. It is also assumed that full aggregation of messages is possible so that if a parent node collects all the acknowledgements from its children, the parent node can combine the acknowledgements from the children with its own acknowledgement to form a single acknowledgement packet. The combined acknowledgement will therefore include information regarding both the parent node, the children of the parent node, and other descendants as well.

According to the exemplary pseudo-code, the collection schedule is determined so that each node transmits only once to another node in the network, and the acknowledgement packets from all of the nodes are collected at the base station. Here, it is assumed that if a node transmits an acknowledgement packet to another node, it is now the responsibility of the other node to forward the acknowledgement to the base station. In this regard, nodes may receive many packets from different neighbors, but they should send only one combined acknowledgement packet, and once the combined acknowledgement packet is sent the sending node should not receive any more acknowledgement packets.

The exemplary pseudo-code employs a level scheduling approach. The base station is level zero (L0), all nodes that can communicate directly to the base station are level one (L1) nodes, all nodes other than the base station that communicate directly to the level one (L1) nodes are level two (L2) nodes, all nodes other than the level one (L1) nodes that communicate directly to the level two (L2) nodes are level three (L3) nodes, and so on. The exemplary pseudo-code starts with the last level nodes. For example, if the network has four levels, the exemplary pseudo-code first considers the level four (L4) nodes, in which the level four (L4) nodes are scheduled so that they send their acknowledgement to either a level three (L3) node or another level four (L4) node. Once all level four (L4) nodes have been considered, the exemplary pseudo-code considers the level three (L3) nodes. In particular, the exemplary pseudo-code computes the last time when a level three (L3) node should receive an acknowledgement packet, and then ensures that the level three (L3) nodes are scheduled so that they transmit after the last time they should receive an acknowledgement packet. Thereafter, exemplary pseudo-code considers the level two (L2) nodes, and then the level one (L1) nodes. Additionally, the collection schedule is computed to prevent, or least minimize, collisions.

Figure 10:
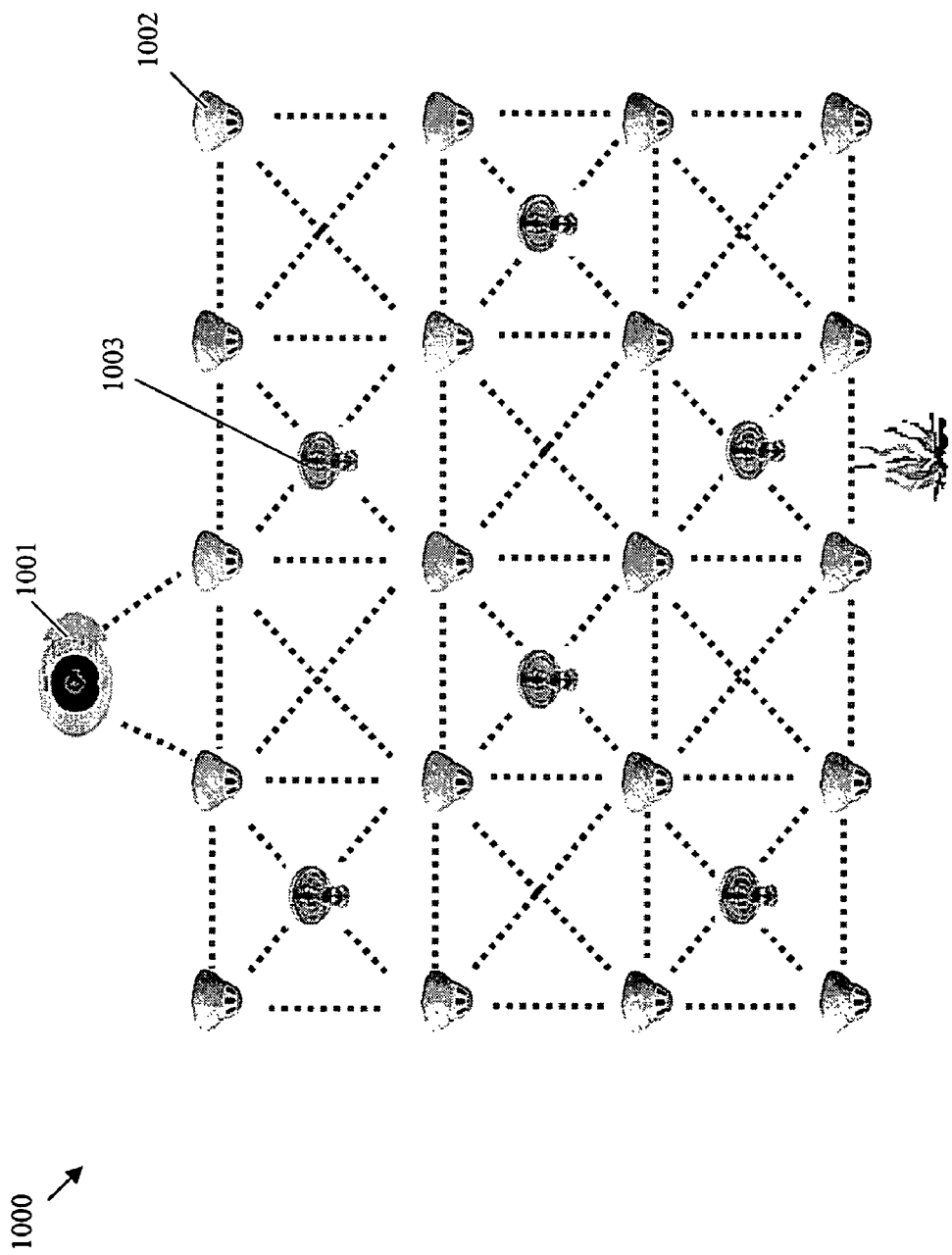
FIG. 10 shows an exemplary system according to the present invention, which performs acknowledged broadcast of messages and collection of acknowledgements.

FIG. 10 shows an exemplary system 1000 according to the present invention, which performs acknowledged broadcast of messages and collection of acknowledgements. The exemplary system 1000 includes a central node 1001 and twenty network nodes 1002. The central node 1001 may be, for example, a wireless base station capable of broadcasting and receiving wireless signals via one or more frequency channels according to any suitable standardized and/or proprietary wireless protocol. The central node 1001 may also include suitable hardware to compute a deterministic schedule for broadcast and/or acknowledgement collection schedules. For example, the central node 1001 may include a suitable processing arrangement (e.g., a microprocessor) to compute such schedules in timely and accurate fashion. The central node 1001 may also include a suitable storage arrangement (e.g., memory) to store information regarding the network and/or network nodes 1002, and to assist in computing and storing the deterministic schedule. The central node 1001 may further include a user interface to receive instructions and/or system parameters from user.

The network nodes 1002 may be, for example, wireless sensor nodes capable of transmitting and receiving wireless signals via one or more frequency channels according to any suitable standardized and/or proprietary wireless protocol. The network nodes 1002 may include, for example, suitable hardware to process/implement a deterministic schedule. For example, the network nodes 1002 may include suitable processing and storage arrangements (e.g., microprocessor and memory) to assist in implementing the deterministic schedule. Here, it is noted that the processing and storage needs of the network nodes 1002 may be different from that of the central node 1001, so according the network nodes 1002 may include different arrangements (e.g., less storage and processing power).

The central node 1001 and/or the network nodes 1002 may be arranged, for example, to communicate with only one or more neighboring nodes so each node need not broadcast to each node directly but may reach the node indirectly via one or more other nodes. In this regard, the arrangement may include, for example, nodes in one or more hierarchical levels.

Figure 11:
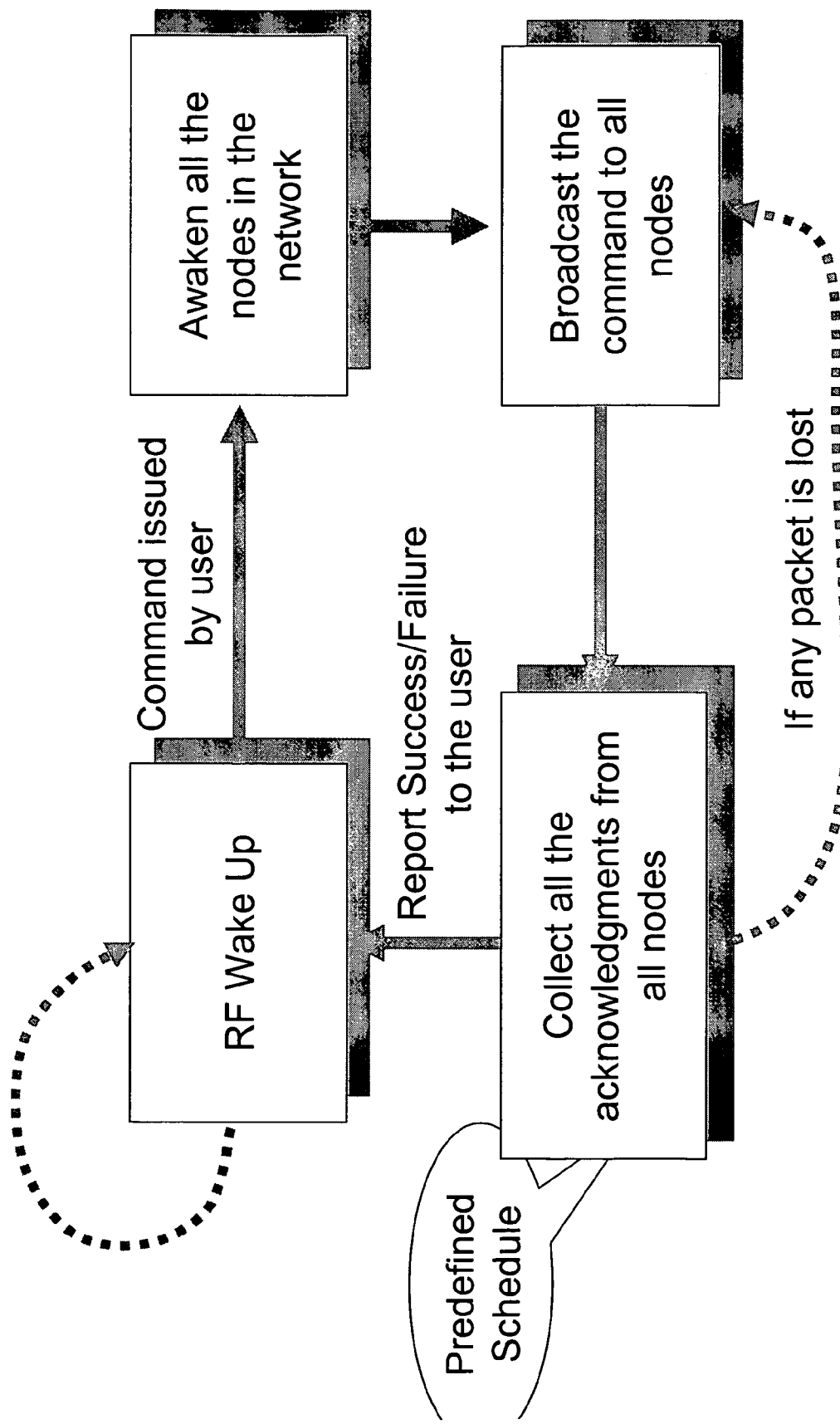
FIG. 11 shows an exemplary method for acknowledged broadcast of messages to nodes of the exemplary network of FIG. 10, in which a predefined deterministic schedule is computed for the message broadcast and the acknowledgement collection during initialization of the network.

FIG. 11 shows an exemplary method for acknowledged broadcast of messages to nodes of the network 1000 of FIG. 10, in which a predefined deterministic schedule is computed for the message broadcast and the acknowledgement collection during initialization of the network. Here, in response to a command issued, for example, by a user the system attempts to awaken all of the nodes in the network by broadcasting the relevant command to the nodes and then collecting acknowledgements from the nodes who perform an RF wakeup to receive the broadcast. Here, the sequence, timing and frequency channel of broadcasted transmissions of the each node and/or its wakeup is predetermined by a deterministic schedule computed by the central node 1002 and distributed to the nodes during the initialization of the network. Thereafter, during normal network operation, whenever the central node 10001 receives a message to broadcast, the message is first sent according to the broadcast schedule to all nodes in the network, then the acknowledgements are collected according to the collection schedule from all nodes in the network and sent to the base station, which in turn may inform the initiator of the message (e.g., the user).

Figure 12:
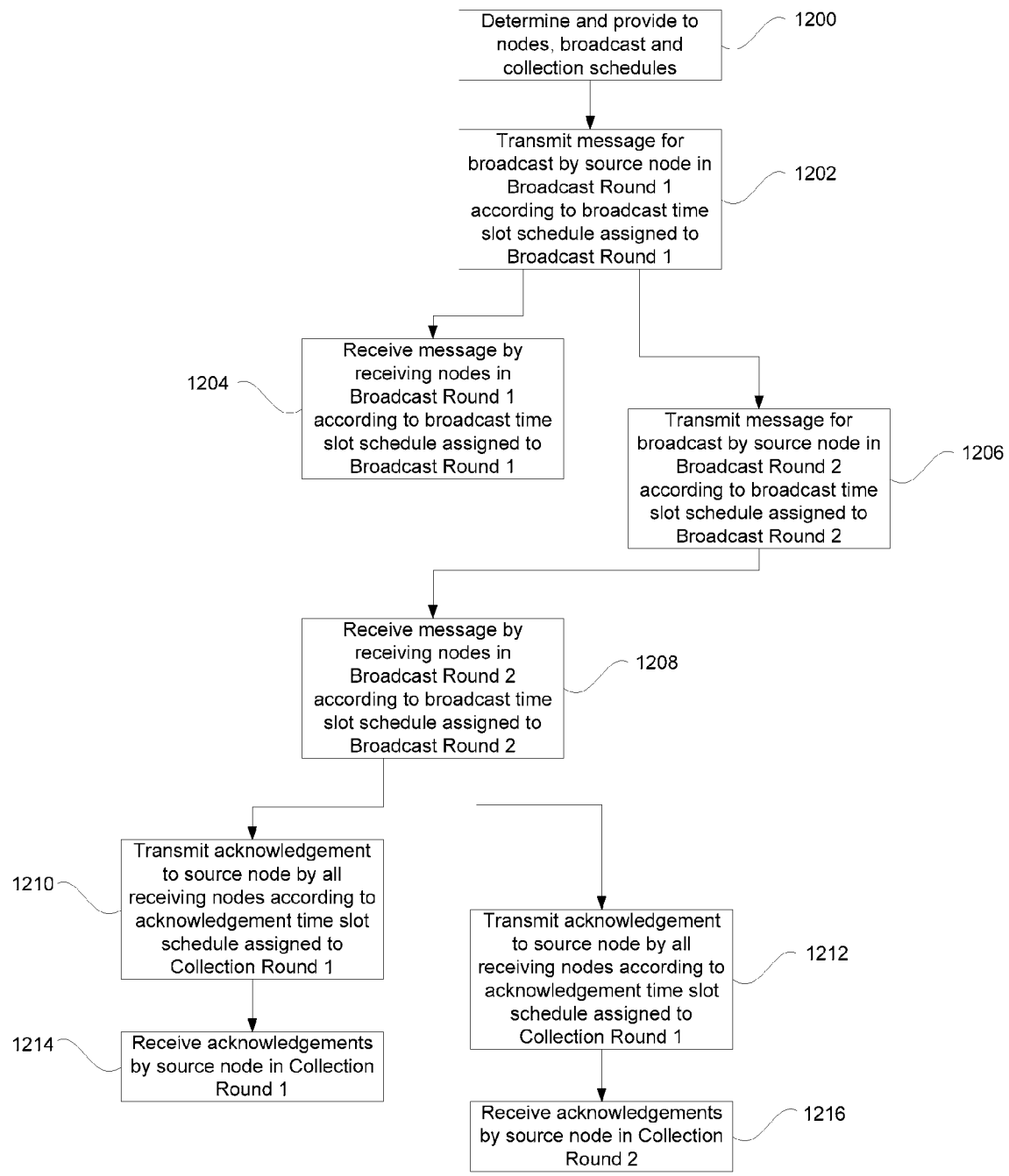
FIG. 12 is a flowchart that illustrates a detailed method of broadcasting, and receiving acknowledgements of, a message, according to an example embodiment of the present invention.

FIG. 12 illustrates a method of broadcasting a message and providing acknowledgements of receipt of the message in further detail, in accordance with the above descriptions, according to an example embodiment of the present invention. At step 1200, schedules may be generated, e.g., by a source node such as a base station, for broadcast and collection rounds, and the schedules may be provided to a plurality of receiving nodes.

At step 1202, a message may be transmitted for broadcast by the source node in Broadcast Round 1, according to the broadcast time slot schedule assigned to Broadcast Round 1.

At sep 1204, during Broadcast Round 1, the receiving nodes may receive the message transmitted at step 1202 according to the broadcast time slot schedule assigned to Broadcast Round 1. Prior to completion of Broadcast Round 1, at step 1206, the message may be transmitted again for broadcast by the source node in Broadcast Round 2 according to the broadcast time slot schedule assigned to Broadcast Round 2.

At step 1208, during Broadcast Round 2, the receiving nodes may receive the message transmitted at step 1206 according to the broadcast time slot schedule assigned to Broadcast Round 2. Although not illustrated in FIG. 12, steps 1204 and 1208 may partially overlap in time, as described above with respect to FIG. 3.

At step 1210, the receiving nodes may transmit acknowledgements of receipt of the message according to the acknowledgement time slot schedule assigned to Collection Round 1 Prior to completion of Collection Round 1, and step 1212, the receiving nodes may transmit acknowledgements of receipt of the message according to the acknowledgement time slot schedule assigned to Collection Round 2.

At step 1214, the source node may receive the acknowledgements in Collection Round 1. At step 1216, the source node may receive acknowledgements in Collection Round 2.

The exemplary message methods and/or exemplary pseudo-code described herein may implement in the general context of computer-executable instructions, such as program modules, executed by one or more computers or other devices. Generally, program modules include routines, programs, objects, components, data structures, etc. that perform particular tasks or implement particular abstract data types. Typically, the functionality of the program-modules may be combined or distributed as desired in various embodiments.

An implementation of the exemplary methods and/or pseudo-code may be stored on or transmitted across some form of computer readable media. Computer readable media can be any available media that can be accessed by a computer. By way of example, and not limitation, computer readable media may comprise computer storage media and communications media.

What is claimed is:

1. A method of acknowledged communication in a network, the method comprising:
   transmitting a message to at least one node of the network, wherein the message is transmitted to the at least one node of the network in each of a plurality of broadcast rounds that overlap one another according to a broadcast schedule;
   receiving the message by the at least one node; and
   transmitting an acknowledgement of the message from the at least one node, wherein the acknowledgement is transmitted by the at least one node in each of a plurality of collection rounds that overlap one another according to a collection schedule;
   wherein:
      each of the broadcast rounds is defined by a respective single scheduled instance of propagation of the message from a source node to the at least one node;
      each of the collection rounds is defined by a respective single scheduled instance of propagation of the acknowledgement from the at least one node to the source node;
      each of the broadcast rounds corresponds to a time period extending from an initial respective transmission of the message from the source node to a time by which all of the at least one node of the network are expected to have received the message based on the respective transmission; and
      the overlaps are in time, such that:
         for each pair of consecutive ones of the plurality of broadcast rounds, at least a portion of one of the pair of broadcast rounds is conducted at a same time as at least a portion of another of the pair of broadcast rounds;

for each pair of consecutive ones of the plurality of collection rounds, at least a portion of one of the pair of collection rounds is conducted at a same time as at least a portion of another of the pair of collection rounds; and the broadcast schedule and the collection schedule are determined prior to the transmission of the message and prior to the collection of the acknowledgement.

2. The method of claim 1, wherein the broadcast schedule and the collection schedule are determined by a central node of the network.

3. A method of communication in a network, the method comprising:

for a particular message to be sent to a plurality of nodes of a network, transmitting the particular message, in each of a plurality of message broadcast rounds, to each of the plurality of nodes, wherein a schedule assigns a respective plurality of consecutive time slots to each of the message broadcast rounds and at least one of the plurality of time slots is assigned to both a first one of the message broadcast rounds and to a second one of the message broadcast rounds such that at least a respective portion of each of the first and second message broadcast rounds is scheduled in each of the at least one of the plurality of time slots;

wherein:
each of the message broadcast rounds is defined by a respective single scheduled instance of propagation of the particular message from a source node to the plurality of nodes;
the plurality of nodes are hierarchically arranged; and
of the plurality of nodes, at least one node is a child node that:
has a plurality of direct parent nodes, each of the direct parent nodes being of a hierarchical level directly above a hierarchical level of the child node;
receives the particular message in the first of the message broadcast rounds directly from a first one of the direct parent nodes of the child node; and
receives the particular message in the second of the message broadcast rounds directly from a second one of the direct parent nodes, different than the first direct parent node, of the child node.

4. The method of claim 3, wherein:
in a first time slot, a first subset of the plurality of nodes receives the particular message transmitted for the first of the message broadcast rounds;
in a second time slot:
for the first of the broadcast rounds, at least one of the first subset of nodes transmits the particular message to a second subset of the plurality of nodes; and
for the second of the message broadcast rounds, at least one other of the first subset of nodes re-receives the particular message.

5. The method of claim 4, wherein each of the second subset of nodes receives the particular message in a third time slot from a different node than that from which the respective node received the particular message in the first time slot.

6. The method of claim 5, wherein the particular message is transmitted in the second of the message broadcast rounds by the same source node that transmits the particular message in the first of the message broadcast rounds, and the particular message directly reaches at least one of the plurality of nodes and indirectly reaches at least one other of the plurality of nodes.

7. A method of communication in a network, the method comprising:

for a particular message to be sent to a plurality of nodes of a network, transmitting the particular message, in each of a plurality of message broadcast rounds, to each of the plurality of nodes, wherein a schedule assigns a respective plurality of consecutive time slots to each of the message broadcast rounds and at least one of the plurality of time slots is assigned to both a first one of the message broadcast rounds and to a second one of the message broadcast rounds such that at least a respective portion of each of the first and second message broadcast rounds is scheduled in each of the at least one of the plurality of time slots;

wherein:
each of the message broadcast rounds is defined by a respective single scheduled instance of propagation of the particular message from a source node to the plurality of nodes;
in each of a plurality of acknowledgement rounds, each of the plurality of nodes transmits an acknowledgement of receipt of the message, each acknowledgement being propagated back to the source node from which all of the plurality of nodes obtains the particular message; and
a plurality of time slots is assigned to each of the acknowledgement rounds, of which at least one time slot is assigned to both a first one of the acknowledgement rounds and a second one of the acknowledgement rounds.

8. The method of claim 7, wherein all of the acknowledgement rounds are subsequent to completion of all of the message broadcast rounds.

9. A method of acknowledged communication in a network, the method comprising:
transmitting a message to at least one node of the network, wherein the message is transmitted to the at least one node of the network in each of a plurality of broadcast rounds that overlap one another according to a predetermined broadcast schedule;
receiving the message by the at least one node; and
transmitting an acknowledgement of receipt of the message from the at least one node, wherein the acknowledgement is transmitted by the at least one node in each of a plurality of collection rounds that overlap one another according to a predetermined collection schedule;

wherein:
each of the broadcast rounds is defined by a respective single scheduled instance of propagation of the message from a source node to the at least one node;
each of the collection rounds is defined by a respective single scheduled instance of propagation of the acknowledgement from the at least one node to the source node;
each of the broadcast rounds corresponds to a time period extending from an initial respective transmission of the message from the source node to a time by which all of the at least one node of the network are expected to have received the message based on the respective transmission; and
the overlaps are in time, such that:
for each pair of consecutive ones of the plurality of broadcast rounds, at least a portion of one of the pair of broadcast rounds is conducted at a same time as at least a portion of another of the pair of broadcast rounds; and for each pair of consecutive ones of the plurality of collection rounds, at least a portion of one of the pair of collection rounds is conducted at a same time as at least a portion of another of the pair of collection rounds.

10. The method of claim 9, wherein a plurality of frequency channels is used to transmit the message.

11. The method of claim 9, wherein a plurality of frequency channels is used to transmit the acknowledgment.

12. The method of claim 9, wherein for each of the plurality of broadcast rounds, the message is transmitted via a different communication path.

13. The method of claim 9, wherein for each of the plurality of collection rounds, the acknowledgement is transmitted via a different communication path.

14. The method of claim 9, wherein the at least one node of the network is arranged in a hierarchical manner with respect to other nodes of the network.

15. The method of claim 14, wherein a parent node of the network combines an acknowledgement from one or more children nodes with an acknowledgement from the parent node so that a single combined acknowledgement is sent by the parent node.

16. The method of claim 9, wherein all data, including the message, transmitted by the source node towards the at least one node in all of the broadcast rounds is identical.

17. The method of claim 9, wherein all of the collection rounds are scheduled by the predetermined collection schedule for after conclusion of all of the broadcast rounds.

18. A method of acknowledged communication in a wireless network, the method comprising:

determining a broadcast schedule to broadcast a message to a plurality of nodes of the wireless network, the broadcast schedule providing a plurality of overlapping broadcast rounds in which to broadcast the message, each round transmitting the message to each of at least one of the plurality of nodes via a different communication path;

determining a collection schedule to collect an acknowledgement from the plurality of nodes, the collection schedule providing a plurality of overlapping acknowledgement rounds to transmit and receive the acknowledgement, each round transmitting the acknowledgement from the plurality of nodes to a central node of the wireless network via a different communication path;

providing the broadcast schedule and the collection schedule to the plurality of nodes;

transmitting the message according to the broadcast schedule; and collecting the acknowledgment according to the collection schedule;

wherein:

each of the acknowledgement rounds is defined by a respective single scheduled instance of propagation of the acknowledgement from the plurality of nodes to the central node;

each of the broadcast rounds:

is defined by a respective single scheduled instance of propagation of the message from the central node to the plurality of nodes; and corresponds to a time period extending from an initial respective transmission of the message from the central node to a time by which all of the plurality of nodes of the network are expected to have received the message based on the respective transmission; and the overlaps are in time, such that:

for each pair of consecutive ones of the plurality of broadcast rounds, at least a portion of one of the pair of broadcast rounds is conducted at a same time as at least a portion of another of the pair of broadcast rounds; and for each pair of consecutive ones of the plurality of acknowledgement rounds, at least a portion of one of the pair of acknowledgement rounds is conducted at a same time as at least a portion of another of the pair of acknowledgement rounds.

19. The method of claim 18, wherein the broadcast schedule and the collection schedule are determined prior to the transmission of the message and prior to the collection of the acknowledgement.

20. The method of claim 19, wherein the broadcast schedule and the collection schedule are determined by the central node of the wireless network.

21. The method of claim 19, wherein a plurality of frequency channels is used to at least one of transmit the message and transmit the acknowledgment.

22. The method of claim 21, wherein the at least one node of the wireless network is arranged in a hierarchical manner with respect to other nodes of the network.

23. The method of claim 22, wherein a parent node of the network combines an acknowledgement from one or more children nodes with an acknowledgement from the parent node so that a single combined acknowledgement is sent by the parent node.

24. A method of acknowledged communication in a wireless network, the method comprising:

transmitting a message to at least one node of the network, wherein the message is transmitted to the at least one node in each of a plurality of broadcast rounds that overlap one another according to a broadcast schedule computed by a central node of the wireless network and distributed to the at least one node prior to the broadcast of the message;

receiving the message by the at least one node; and transmitting an acknowledgement of receipt of the message by the at least one node, wherein the acknowledgement is transmitted in each of a plurality of collection rounds that overlap one another according to a collection schedule computed by the central node and distributed to the at least one node prior to the collection of the acknowledgement;

wherein:

each of the collection rounds is defined by a respective single scheduled instance of propagation of the acknowledgement from the at least one node to the central node;

a plurality of frequency channels is used to at least one of transmit the message and transmit the acknowledgment;

each of the broadcast rounds:

is defined by a respective single scheduled instance of propagation of the message from the central node to the at least one node; and corresponds to a time period extending from an initial respective transmission of the message from the central node to a time by which all of the at least one node of the network are expected to have received the message based on the respective transmission; and the overlaps are in time, such that:

for each pair of consecutive ones of the plurality of broadcast rounds, at least a portion of one of the pair of broadcast rounds is conducted at a same time as at least a portion of another of the pair of broadcast rounds; and for each pair of consecutive ones of the plurality of collection rounds, at least a portion of one of the pair of collection rounds is conducted at a same time as at least a portion of another of the pair of collection rounds.

25. The method of claim 24, wherein at least one of:

for each of the plurality of broadcast rounds, the message is transmitted to the at least one node via a different communication path, and for each of the plurality of collection rounds, the acknowledgement is transmitted via a different communication path.

26. The method of claim 25, wherein the at least one node of the network is arranged in a hierarchical manner with respect to other nodes of the network so that a parent node of the network combines an acknowledgement from one or more children nodes with an acknowledgement from the parent node so that a single combined acknowledgement is sent by the parent node.

* * * * *